United States Patent
Scheuerlein (10) Patent No.: US 7,472,030 B2
(45) Date of Patent: Dec. 30, 2008

(54) DUAL MODE SINGLE TEMPERATURE TRIMMING

(75) Inventor: Eric Scheuerlein, Los Gatos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 260 days.

(21) Appl. No.: 11/462,602

(22) Filed: Aug. 4, 2006

(65) Prior Publication Data
US 2008/0030259 A1 Feb. 7, 2008

(51) Int. Cl.
*G01K 15/00* (2006.01)
(52) U.S. Cl. .................. 702/99; 702/130; 702/136; 323/311; 323/313; 323/315; 323/907; 700/275; 700/276; 700/277; 700/278
(58) Field of Classification Search .................. 702/99, 702/130, 136; 323/311, 313, 315, 907; 700/275–278
See application file for complete search history.

(56) References Cited
U.S. PATENT DOCUMENTS
5,621,307 A 4/1997 Beggs 6,011,422 A 1/2000 Koglin
6,591,210 B1 * 7/2003 Lorenz .................. 702/99

FOREIGN PATENT DOCUMENTS
EP 1337037 A1 8/2003

* cited by examiner

*Primary Examiner*—Tung S Lau
*Assistant Examiner*—Sujoy K Kundu (57) ABSTRACT

In a system for performing a dual mode single temperature trim upon an electronic device to remove combined mismatch and process variation errors, a dynamic element matching control is configured for enabling dynamic element matching of components of the electronic device. A process trim module is configured for performing a process trim to remove a temperature dependant error from the electronic device while the dynamic element matching is enabled within the electronic device. A mismatch trim module is configured for performing a mismatch trim to remove a mismatch error from the electronic device after the process trim has been performed. The mismatch trim is performed on a portion of the electronic device for which the dynamic element matching has been disabled. Additionally, the mismatch trim is performed at substantially an equivalent temperature to a temperature at which the process trim was performed.

22 Claims, 6 Drawing Sheets

FIG. 1

DC Initial State: Error = Gain Error + Offset Error

UTILIZE A CALIBRATION TECHNIQUE TO ACTIVELY REMOVE A MISMATCH ERROR CONSTITUENT OF THE COMBINED MISMATCH AND PROCESS VARIATION ERRORS OF AN ELECTRONIC DEVICE.
305

PERFORM A PROCESS TRIM TO TRIM OUT A TEMPERATURE DEPENDANT ERROR OF THE ELECTRONIC DEVICE, WHEREIN THE PROCESS TRIM IS PERFORMED WHILE THE MISMATCH ERROR CONSTITUENT IS BEING ACTIVELY REMOVED.
315

CEASE THE ACTIVE REMOVAL OF THE MISMATCH ERROR CONSTITUENT.
325

PERFORM A MISMATCH TRIM TO TRIM OUT THE MISMATCH ERROR CONSTITUENT, WHEREIN THE MISMATCH TRIM IS PERFORMED WHILE THE ACTIVE REMOVAL OF THE MISMATCH ERROR CONSTITUENT IS CEASED, AND WHEREIN THE ELECTRONIC DEVICE REMAINS AT SUBSTANTIALLY AN EQUIVALENT TEMPERATURE TO A TEMPERATURE AT WHICH THE PROCESS TRIM WAS PERFORMED.
335

FIG. 3

PRIOR TO PROCESS ERROR TRIM, WITH DYNAMIC ELEMENT MATCHING ON: ERROR = GAIN ERROR

FIG. 4

AFTER PROCESS ERROR TRIM, WITH DYNAMIC ELEMENT MATCHING ON: ERROR = 0

FIG. 5

AFTER PROCESS TRIM, WITH DYNAMIC ELEMENT
MATCHING OFF: ERROR = OFFSET ERROR

FIG. 6

AFTER MISMATCH ERROR TRIM AND PROCESS ERROR
TRIM, DYNAMIC ELEMENT MATCHING OFF: ERROR = 0

UTILIZE DYNAMIC ELEMENT MATCHING TO ACTIVELY REMOVE A MISMATCH ERROR CONSTITUENT OF COMBINED MISMATCH AND PROCESS VARIATION ERRORS IN A BANDGAP GENERATOR CIRCUIT.
810

PERFORM A PROCESS TRIM TO TRIM OUT A TEMPERATURE DEPENDANT ERROR OF A BIPOLAR JUNCTION TRANSISTOR USED IN THE BANDGAP GENERATOR CIRCUIT, WHEREIN THE PROCESS TRIM IS PERFORMED WHILE THE MISMATCH ERROR CONSTITUENT IS BEING ACTIVELY REMOVED.
820

PERFORM A MISMATCH TRIM TO TRIM OUT THE MISMATCH ERROR CONSTITUENT, WHEREIN THE MISMATCH TRIM IS PERFORMED WHILE THE ACTIVE REMOVAL OF THE MISMATCH ERROR CONSTITUENT IS CEASED, AND WHEREIN THE BANDGAP GENERATOR CIRCUIT REMAINS AT SUBSTANTIALLY AN EQUIVALENT TEMPERATURE TO A TEMPERATURE AT WHICH THE PROCESS TRIM WAS PERFORMED.
830

FIG. 8

DUAL MODE SINGLE TEMPERATURE TRIMMING

TECHNICAL FIELD

Embodiments of the present technology pertain to circuit manufacturing, particularly to trimming errors from circuits.

BACKGROUND ART

There are several sources of error that contribute to non-ideal performance of circuits, such as bias circuits, and many of these sources of error cannot be removed by the designer of such a circuit. Such sources of error include errors such as, but not limited to: mechanical stress during the manufacturing of the die; mechanical stress during packaging; and imperfections during manufacturing of the die resulting in variant electrical parameters. Such sources of error affect the circuit in the form of process variation and mismatch.

Process variation is well known in the art, and is essentially variation of the electrical parameters of a class of devices from part to part. Mismatch error is also well known in the art, and is essentially electrical parameter variation from an average value in devices that are expected to have matching values. Mismatch error only has meaning among devices in a single part. For this reason, it is also known as intra-die electrical parameter variation.

In a typical bias circuit, such as a scalable bandgap voltage generator, a bias voltage is generated using three types of devices in the signal path: metal oxide semiconductor field effect transistors (MOSFETs), bipolar junction transistors (BJTs), and resistors. During the manufacture of a circuit, the effect of mismatch and process variation on all three of these device types (MOSFETs, BJTs, and resistors) are present and should be considered. Some of these error sources can be removed by design and some can not. In bias circuits for example, BJT process spread cannot be removed by design and is the traditional error source requiring trim. This is because the complementary to absolute temperature component of the bias circuit is typically generated by a single BJT device. As such, the $V_{BE}$ output (the CTAT component) of the BJT device has a gain (slope) variation from the ideal gain across a given temperature range. However, it is commonly known that the gain can be adjusted toward the ideal slope by trimming, for example, the current proportional to absolute temperature ($I_{PTAT}$) that biases the CTAT BJT device. Other techniques for performing trimming to adjust the gain of the BJT toward ideal are also well known in the art. All of these techniques take advantage of the fact that the BJT process spread on the $V_{BE}$ generating device produces a pure gain error. A pure gain error results in the y-intercept of the signal versus temperature line remaining stable while the slope varies. Thus, when the BJT process error is the only error in a circuit, it can be removed by gain trimming while the circuit remains at a single temperature.

Likewise, the effect of manufacturing induced mismatch is often a critical source of error with respect to MOSFETs and resistors. MOSFET mismatch in particular, is a large source of error in circuits, such as scalable bandgap circuits, which perform extensive mirroring using MOS devices. With respect to MOS devices, mismatch on amplifier inputs and current mirrors alters the y-intercept of an expected voltage with respect to temperature, but leaves the slope relatively unchanged. In other words, mismatch error in MOS devices causes a pure offset error/absolute value error. For example, in a bandgap generator, MOSFET mismatch can cause an error on the bandgap voltage that is effectively a consistent value (such as 10 millivolts too high or 20 millivolts too low) across a given temperature range. When MOSFET error is known or is the only error present, well known trimming techniques can remove MOSFET mismatch error through trimming while the circuit remains at a single temperature.

A problem arises however, when both gain error and offset error exist simultaneously in a circuit. With multiple simultaneous sources of error, some of which result in a gain error and some of which result in an offset error, present manufacturing techniques are unable to sort these errors apart from one another while the circuit remains at a single temperature. Two techniques have been widely used to deal with such a problem, but each has drawbacks.

In the first technique, measurements of circuit operating parameters are made at two separate temperatures. This allows the gain component of the error to be observed, and thus separated from the offset component. This technique however adds time, expense, and complexity to a manufacturing process. Time is added because, testing and trimming on a particular component takes longer due to waiting for a component to stabilize at a second temperature so a second set of measurements can be made. Expense and complexity are added by creating a manufacturing line which must operate at two separate temperatures instead of one constant temperature. Expense and complexity are also added by handling a circuit twice and performing extra measurements on a circuit under test and calibration.

In the second technique, during manufacturing, a process variation induced gain error is calibrated by direct measurement or else is roughly trimmed while offset error is ignored. When the circuit is later in operation, such as by a customer, dynamic element matching techniques (otherwise known as chopping), are used to actively average out mismatch induced offset errors. This second technique is fairly effective, but has several drawbacks. One drawback is that trimming the process error of the BJT individually requires very precise temperature control of the manufacturing environment, often in excess of capability. Ignoring other errors all together and trimming the BJT process variation by monitoring the bandgap voltage is also problematic because other error types may be exacerbated by the trim. Another drawback is that dynamic element matching is a power hungry error reduction technique that causes the circuit to consume additional power. Increased power consumption becomes even more apparent, when the output of a circuit needs to be sampled at a high frequency. In such a case, the dynamic element matching techniques involved are also typically performed at a high frequency, which causes the circuit to consume even more power. Yet another drawback is that such dynamic element matching techniques are often more complex to implement and manage compared to continuous DC signals.

As can be seen, current manufacturing methods and processes provide for some solutions to deal with situations where the previously described process variation induced gain errors and mismatch induced offset errors are simultaneously present in a circuit. However, these current methods often inadequately address the errors or else are costly, complex, and/or time consuming to implement.

SUMMARY

In a system for performing a dual mode single temperature trim upon an electronic device to remove combined mismatch and process variation errors, a dynamic element matching control is configured for enabling dynamic element matching of components of the electronic device. A process trim module is configured for performing a process trim to remove a temperature dependant error from the electronic device while the dynamic element matching is enabled within the electronic device. A mismatch trim module is configured for performing a mismatch trim to remove a mismatch error from the electronic device after the process trim has been performed. The mismatch trim is performed on a portion of the electronic device for which the dynamic element matching has been disabled. Additionally, the mismatch trim is performed at substantially an equivalent temperature to a temperature at which the process trim was performed.

BRIEF DESCRIPTION OF THE DRAWINGS

The accompanying drawings, which are incorporated in and form a part of this specification, illustrate embodiments of the presently described technology for dual mode single temperature trimming and, together with the description, serve to explain the principles of the technology.

The drawings referred to in this description should not be understood as being drawn to scale unless specifically noted.

DETAILED DESCRIPTION

Reference will now be made in detail to embodiments of the present technology of dual mode single temperature trimming, examples of which are illustrated in the accompanying drawings. While the present technology will be described in conjunction with the preferred embodiments, it will be understood that they are not intended to limit the described technology to these embodiments. On the contrary, the present technology is intended to cover alternatives, modifications, and equivalent, which may be included within the spirit and scope of the technology as defined by the appended claims. Furthermore, in the following detailed description of the present technology, numerous specific details are set forth in order to provide a thorough understanding of the present technology. However, it will be recognized by one skilled in the art that the present technology may be practiced without these specific details or with equivalents thereof. In other instances, well-known methods, procedures, components, and circuits have not been described in detail as not to unnecessarily obscure aspects of the present technology.

Overview of Discussion

The present technology for dual mode single temperature trimming provides a system and methodology for trimming error sources which contribute to a combined gain and offset error in an electronic device, such as, for example a bias generation circuit. The system and methodology allow for the significant cost advantage of trimming multiple classes of errors at a single temperature. This is a benefit normally attributed to more expensive and time consuming multi-temperature electronic device/circuit calibration. In the present technology, an electronic device is operated in a fashion which allows different classes of errors, out of a combined signal error, to be isolated and trimmed during calibration. The fashion of operation which allows the classes of errors to be isolated is only required during calibration, and does not have to be implemented during regular circuit operation.

With respect to this Detailed Description, an exemplary embodiment of a system for performing a dual mode single temperature trimming of a circuit in accordance with the present technology will be described. The discussion will start with an overview of this system and then move on to describe the structure and operation of individual components of this system. Operation of this system will be described in conjunction with two exemplary methods of operation, and will be further facilitated by the discussion of various graphs of output signals from an exemplary circuit upon which embodiments of the present technology may be practiced.

Figure 1:
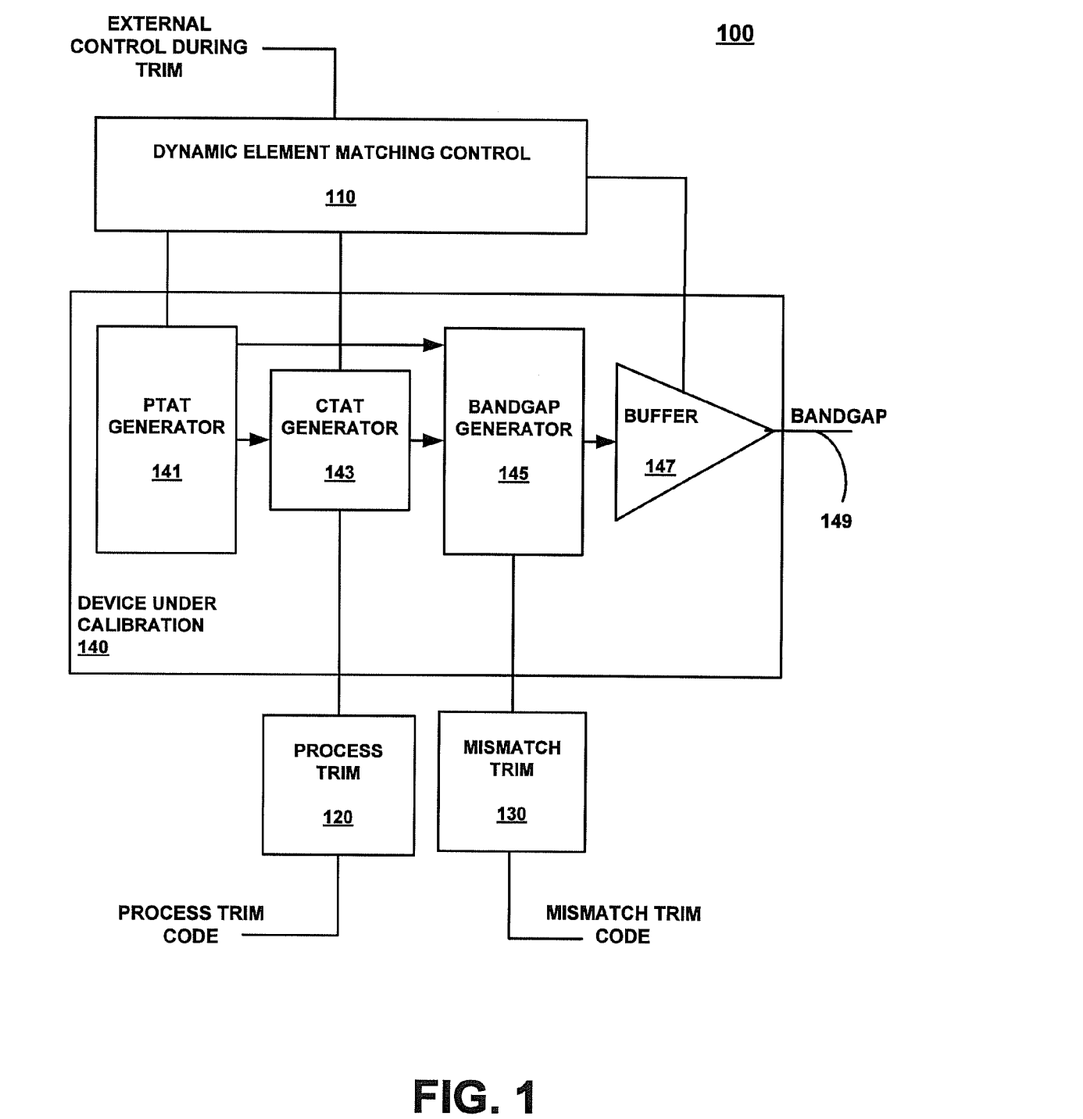
FIG. 1 is a block diagram of a system for performing a dual mode single temperature trim upon an electronic device, in accordance with an embodiment of the present technology.

Exemplary System for Dual Mode Single
Temperature Trimming of an Electronic Device FIG. 1 shows a block diagram of a system 100 for performing a dual mode single temperature trim upon an electronic device, in accordance with an embodiment of the present technology. As illustrated, system 100 is comprised of a dynamic element matching control 110, a process trim module 120, and a mismatch trim module 130, all of which are removably coupled with an exemplary electronic device under calibration 140 (which is not part of system 100). System 100 is an exemplary means for employing the methodologies of the present technology to individually isolate and eliminate sources of a combined gain and offset signal error from an electronic device, such as electronic device 140. As will become apparent, system 100 advantageously operates selected components of electronic device 140 in a fashion which allows individual error sources of the combined error to be identified, and subsequently eliminated via trimming methods which are commonly known in the art.

As shown, exemplary electronic device under calibration 140 is a block diagram of a common bandgap voltage generator circuit. Device 140 is comprised of a PTAT (Proportional to Absolute Temperature) generator 141, a CTAT (Complementary to Absolute Temperature) generator 143, a bandgap generator 145, and a buffer 14. Buffer 147 has an output 149, from which a bandgap signal is output. PTAT generator 141, CTAT generator 143, bandgap generator 145 and buffer 147 are all comprised of at least some components such as Metal Oxide Semiconductor Field Effect Transistors (MOSFETs) or resistors which are subject to manufacturing related mismatch errors. Similarly CTAT generator is comprised of at least one component, such as a bipolar junction transistor, which is subject to a manufacturing related process error.

Though the exemplary embodiment of system 100 is shown calibrating a bandgap generator (device 140), it is appreciated that other embodiments of system 100 are configurable to advantageously provide dual mode single input signal data point calibration of other devices/circuits which experience a combined gain and offset error similar to the combined gain and offset error that will be described herein in conjunction with electronic device 140. Some examples of such circuits include: analog-to-digital conversion circuits, analog sensor circuits, bandgap generation circuits, scalable bandgap generation circuits, other biasing circuits, and etc. In some embodiments the single input signal can be a temperature signal, with the data point being a particular temperature.

Figure 2:
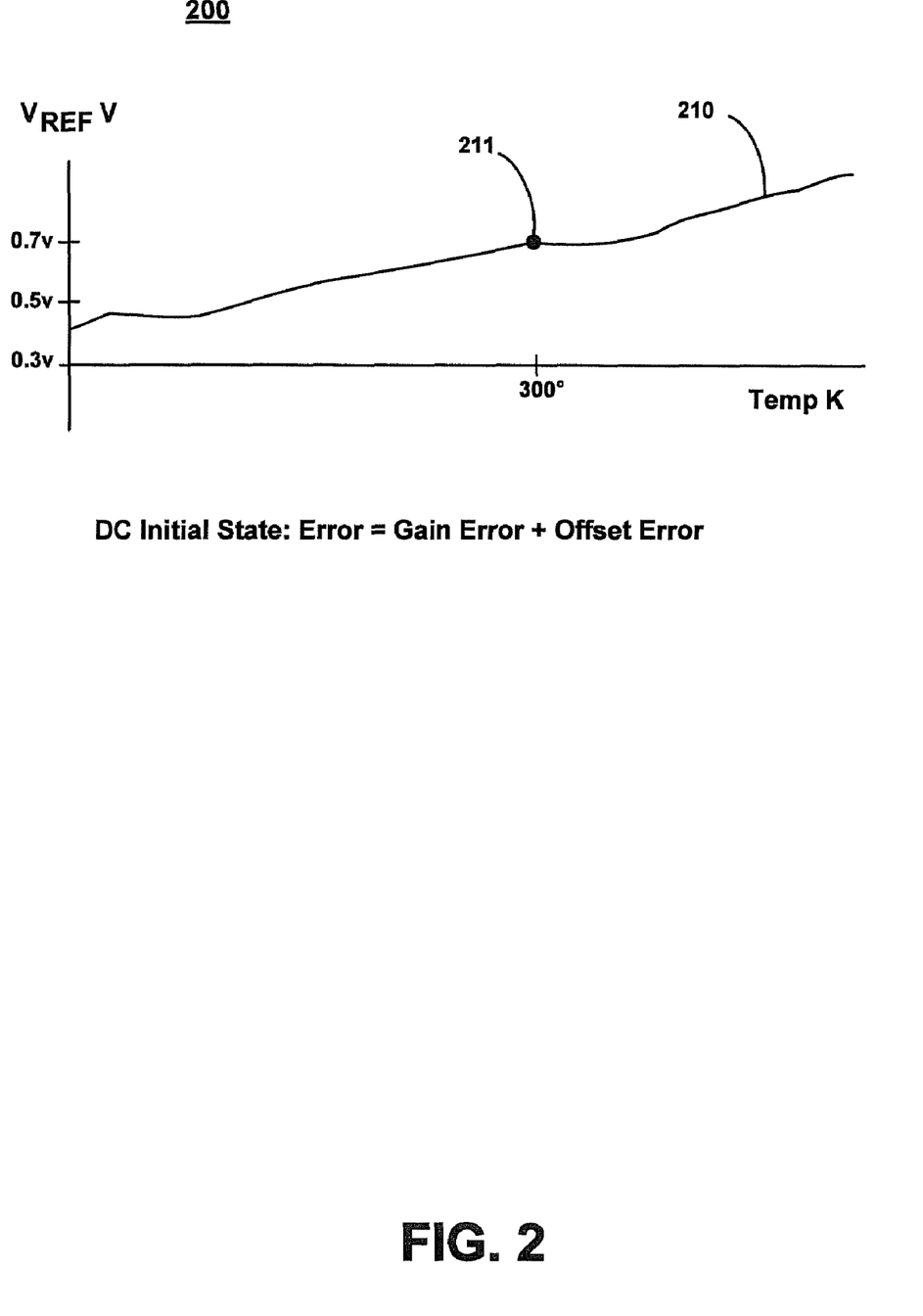
FIG. 2 is a graph of an exemplary initial Direct Current (DC) output of an electronic device upon which embodiments of the present technology may be practiced.

FIG. 2 is a graph of an exemplary initial Direct Current (DC) output of an electronic device upon which embodiments of the present technology may be practiced. For example, in one embodiment, FIG. 2 shows a DC initial state signal 210 that is output as a bandgap voltage from output 149 of electronic device under calibration 140. Signal 210 is shown graphed on an x-y coordinate axis, where the x-axis represents degrees in Kelvin and the y-axis represents a reference voltage in volts. It will be obvious to anyone skilled in the art that the x-axis of this figure could instead be any signal input to an analog system that follows a linear input-output relationship. For example, a digital input code in a DAC. In one embodiment, a bandgap bias circuit, the desired output of device 140 is a straight-line across temperature. In FIG. 2, as well as in FIGS. 4-7, the x-axis represents the desired output bandgap voltage signal across temperature, which for purposes of example can be assumed to be 300 millivolts DC. As can be seen from graph 200, signal 210 has some error component of gain and some error component of offset. This is easy to discern when output signal 210 is measured (and graphed) with respect to various temperatures as it is in FIG. 2. However, the gain and offset components of signal 210 are not apparent when signal 210 is measured at a single point 211, which corresponds to a single temperature of, for example, 300 degrees Kelvin. Thus, if the voltage at point 211 is found to be 700 millivolts DC, which is 400 millivolts above the desired output of 300 millivolts DC, it is not readily apparent whether this 400 millivolt error in signal 210 is due to a gain error, an offset error, or both.

Referring again to FIG. 1, system 100 is useful for calibrating an electronic device or circuit at numerous states or stages in manufacture. However, it is well known that packaging of electronic devices (for instance inserting a die into a plastic or ceramic dual in-line package or some other packaged form in which a consumer may utilize the electronic device) causes mechanical stresses which contribute to variations in electrical properties. Therefore, in one embodiment, system 100 is utilized to calibrate electronic devices, such as device 140, after they have been packaged. Thus, in one embodiment of the present technology, electronic device 140 comprises a packaged device.

In system 100, dynamic element matching control 110 is coupled with a plurality of the blocks of electronic device 140 which are known to be susceptible to manufacturing related mismatch errors. More specifically, dynamic element matching control 110 is coupled with components (such as MOSFETs and resistors) within PTAT generator 141, CTAT generator 143, and buffer 147 which may experience mismatch errors. In other embodiments of system 100, depending on the device under calibration, dynamic element matching control 110 is comprised of more couplings or fewer couplings to the device under calibration, depending on how many blocks and/or components are subject to mismatch errors which are desired to be actively eliminated. Via these couplings, dynamic element matching control 110 enables dynamic matching (also known as chopping) of the components of electronic device 140 with which it is coupled. When enabled throughout electronic device 140, the dynamic element matching actively eliminates the mismatch component of error from the bandgap signal which is output from buffer 147.

Additionally, in one embodiment, dynamic element matching control 110 is configured to receive external control signals during the calibration and trimming of electronic device under calibration 140. In one embodiment, this external control is coupled with a computer, test station, or some other controlling device. These control signals are useful for enabling and disabling dynamic element matching to a device under test, such as device 140. In one embodiment, for example, in response to receiving these external control signals, dynamic element matching control 110 selectively enables and disables dynamic matching to specific components in portions of an electronic device under test. For instance, in response to receipt of one set of external control signals, dynamic element matching control enables dynamic element matching for CTAT generator 143 and buffer 147 and disables dynamic element matching for PTAT generator 141. Additionally, through receipt of external control, dynamic element matching control 110 can place selected components of a device under calibration into different modes of operation in order to affect dynamic element matching of the selected components.

It is appreciated, that dynamic element matching is typically a power hungry method to remove offset error from an operational circuit. This is especially the case in instances where the dynamic element matching is required to switch the states of components at a very high speed. High speed switching normally consumes a good deal of power. However, embodiments of the present technology utilize dynamic element matching in a calibration environment, rather than in an operational environment. Because of this, in most embodiments, dynamic element matching can be performed at a much lower frequency (for instance, with switching between components being performed every 35 μs rather than every 200 ns as may have been required in an operational application of the circuit. The ability to perform dynamic element matching at a lower frequency allows the present technology to realize at least two benefits. First is lower power consumption, as the lower chopping frequency will use less power. Second is increased accuracy, due to longer times allowed for the circuit to settle into each switched state.

Process trim module 120 is coupled with one or more of the blocks of an electronic device under calibration which are known to be susceptible to manufacturing related process errors. Process trim module 120 is used to perform a process trim to remove a temperature dependant error, such as a purely gain or purely offset error, from the electronic device under test while dynamic element matching is enabled to all components with which dynamic element matching control 110 is coupled. The process trim represents the first mode of trimming in the dual mode single temperature trimming. In the present technology, process trim module 120 performs the process trim in any one of numerous well known manners for performing such process trims.

In the displayed embodiment, process trim module 120 is coupled with CTAT generator 143 for eliminating, though trimming, a process related gain error in a CTAT circuit of device under calibration 140. For example, process trim module 120 removes process related gain error from a bipolar junction transistor that is utilized within a circuit of CTAT generator 143 by trimming the current density of the transistor. In other embodiments, process trim module 120 is also similarly coupled with other portions of a device under calibration for the purpose of trimming out process related gain errors. For example, in another embodiment of the present technology, process trim module 120 may be coupled with PTAT generator 141 for similarly eliminating, through trimming, a process related error in a PTAT circuit within device under calibration 140.

In one embodiment, process trim module 120 receives an external trim code which directs the amount of trim to be applied while an output signal (for example from output 149) of the electronic device under test is monitored. The monitoring provides a feedback to control how much trimming is performed. In one embodiment, the process trim code is received from the same external control which provides external control inputs to dynamic element matching control 110. This facilitates trimming of the process trim to coincide with a time while dynamic element matching is enabled throughout the electronic device under test.

Mismatch trim 130 module is coupled with one or more of the blocks of an electronic device under calibration which are known to be susceptible to manufacturing related mismatch errors. Mismatch trim module 130 is used to perform a mismatch trim to remove an error from the electronic device under test. The mismatch trim represents the second mode of trim in the dual mode single temperature trimming. The mismatch trim is performed after process trimming has been performed by process trim module 120 to remove process related error. The mismatch trim is also performed at substantially the same temperature at which any process trim was performed by process trim module 120. This advantageously allows device under test 140 to be manufactured and/or calibrated at a single temperature. Additionally, the mismatch trim is performed while dynamic element matching is disabled. In one embodiment, the mismatch trimming is performed while dynamic element matching is disabled to all components of the electronic device under test. This is most useful when a mismatch error results in a single error type on the output either gain or offset errors but not both. In another embodiment, the mismatch trim is performed while dynamic element matching is selectively disabled to the components being trimmed, but is enabled to other untrimmed components with which dynamic element matching control 110 is coupled. This is useful when mismatch trimming is being performed incrementally on several sets of components whose mismatch results in different error classes either gain or offset errors. In the present technology, mismatch trim module 130 performs the mismatch trim or trims in any one of numerous well known manners for performing such mismatch trims.

In the displayed embodiment, mismatch trim module 130 is coupled with bandgap generator 145 for eliminating, though trimming, any mismatch related offset error. However, in the displayed embodiment, mismatch trim module 130 may also perform a mismatch trim to remove a mismatch related offset error from MOSFETs used for mirroring and/or amplifying signals anywhere within device under calibration 140. In other embodiments, mismatch trim module 130 may be coupled with more locations in a device under test. For example, in one embodiment, mismatch trim module 130 is also coupled with components in PTAT generator 141, CTAT generator 143, and buffer 147 that are coupled with dynamic element matching control 110. In such an embodiment, mismatch trim module 130 is used to incrementally remove mismatch error from components, such as metal oxide semiconductors, BJTs, and/or resistors, as required in order to bring an output signal to a specified value.

In one embodiment, mismatch trim module 130 receives an external trim code which directs the amount of trim to be applied as an output signal (for example from output 149) of the electronic device under test is monitored. The monitoring provides a feedback to control how much trimming is performed. In one embodiment, the mismatch trim code is received from the same external control which provides external control inputs to dynamic element matching control 110. This facilitates timing of the mismatch trim or trims to coincide with a time while dynamic element matching is either disabled throughout the electronic device under test or disabled to a particular set of components which are undergoing a mismatch trim.

Exemplary Methods of Operation

Figure 3:
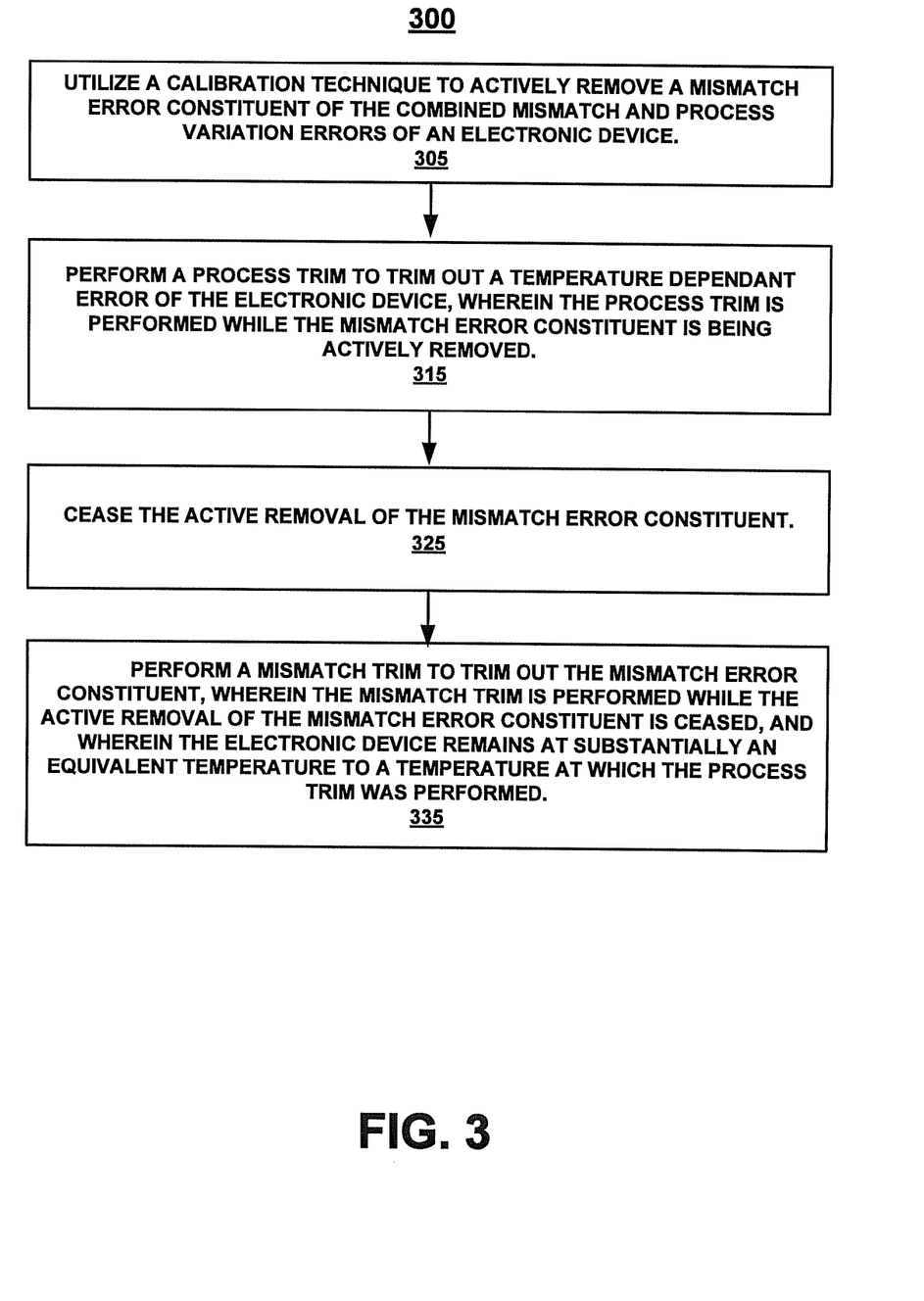
FIG. 3 is a flow diagram of a method for performing a dual mode single input signal data point trim upon an electronic device to remove a combined gain and offset error, according to an embodiment of the present technology.
Figure 8:
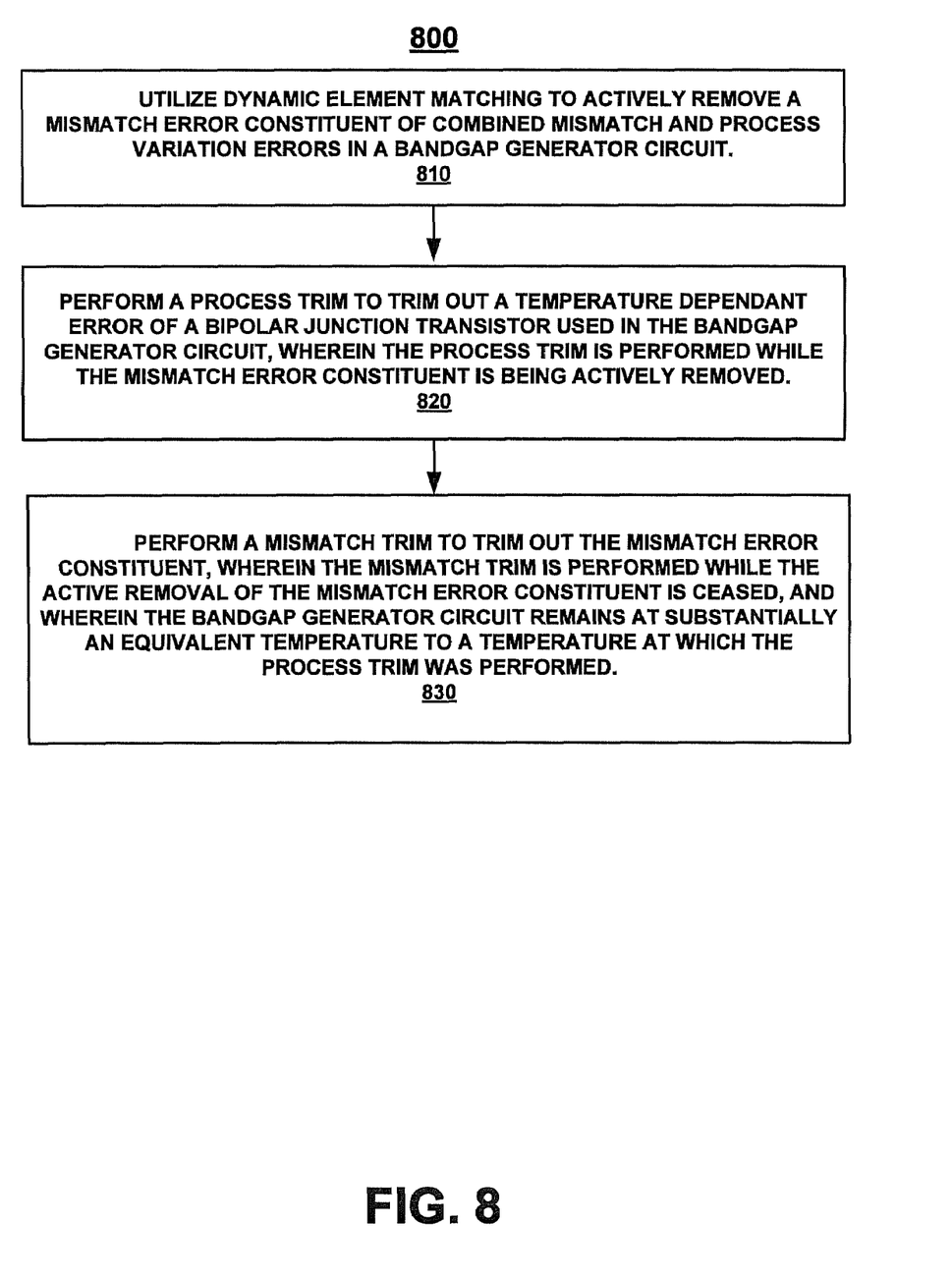
FIG. 8 is a flow diagram of a method for performing a dual mode single temperature trim to remove a combined gain and offset error from a bandgap generator circuit, according to an embodiment of the present technology.

The following discussion sets forth in detail the operation of the present technology of dual mode single temperature trimming through description of exemplary embodiments. With reference to FIGS. 3 and 8, flow diagrams 300 and 800 each illustrate exemplary steps used by various embodiments of the present technology. Flow diagrams 300 and 800 include processes that, in various embodiments, are carried out by a processor or system (such as system 100 of FIG. 1) under the control of computer-readable and computer-executable instructions. The computer-readable and computer-executable instructions reside, for example, in peripheral computer readable media (e.g., a compact diskette) or in data storage features such as computer usable volatile memory, computer usable non-volatile memory, and/or a data storage unit (e.g., a hard disk drive). The computer-readable and computer-executable instructions are used to control or operate in conjunction with, for example, a processor and/or processors. Although specific steps are disclosed in flow diagrams 300 and 800, such steps are exemplary. That is, embodiments are well suited to performing various other steps or variations of the steps recited in flow diagrams 300 and 800. It is appreciated that the steps in flow diagrams 300 and 800 may be performed in an order different than presented, that not all of the steps may be performed, and that certain steps may be performed manually.

FIG. 3 is a flow diagram 300 of a method for performing a dual mode single input signal data point trim upon an electronic device to remove a combined gain and offset error, according to an embodiment of the present technology. In some embodiments, the electronic device which method 300 is performed upon is a packaged electronic device.

In 305 of flow diagram 300, in one embodiment, a calibration technique is utilized to actively remove the offset error constituent of the combined gain and offset error of an electronic device. In one embodiment, for example, dynamic element matching control 110 performs dynamic element matching upon one or more sets of components in electronic device under calibration 140, which are known to be susceptible to mismatch. This actively removes the mismatch error constituent, of the combined mismatch and process variation error, from the output signal of electronic device 140.

Figure 4:
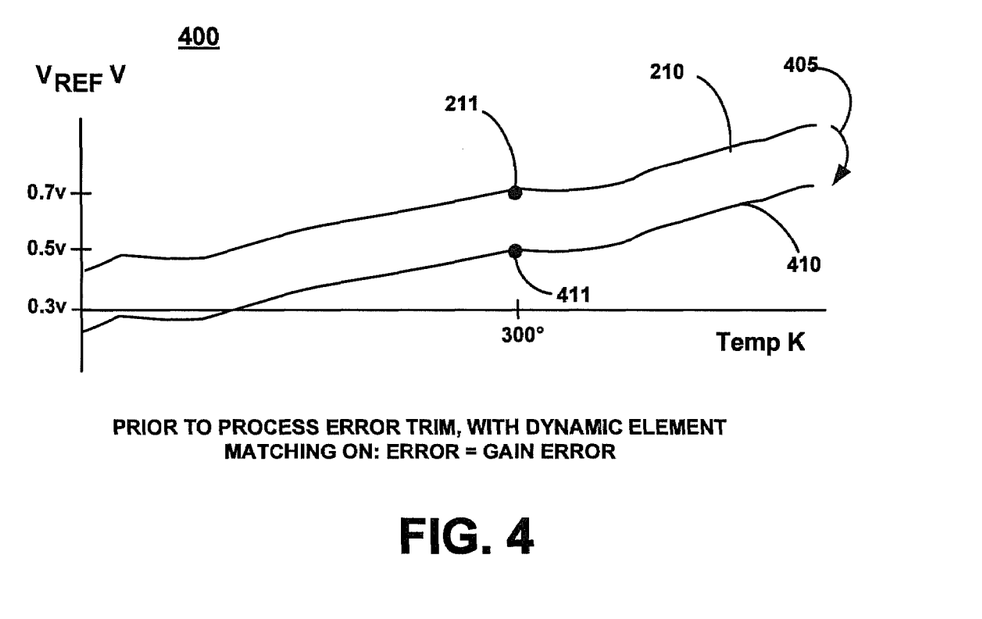
FIG. 4 is a first graph illustrating an exemplary change in the output of an electronic device upon which an embodiment of the present technology is being practiced.

FIG. 4 is a first graph 400 illustrating an exemplary change in the output of an electronic device upon which an embodiment of the present technology is being practiced. FIG. 4 shows the same coordinate axis as graph 200 in FIG. 2. In FIG. 4, signal 210 and the voltage at point 211 represent the same initial state DC voltage as described in graph 200. Arrow 405 shows how offset is actively removed, for example, by dynamic element matching. When offset is actively removed, the voltage at point 211 moves from 700 millivolts DC down to, for instance, 500 millivolts DC at the same temperature (300 degrees Kelvin) at point 411. This still leaves a 200 millivolt error in signal 410, which is now attributable substantially to a gain error since the offset error has been actively removed. Moreover, signal 410 also illustrates that the offset error (which would be constant over temperature) will now be removed for all other temperatures as well, not just the single temperature associated with point 411.

In 315 of flow diagram 300, in one embodiment, a process trim is performed to trim out a temperature dependant error, such as a purely gain or purely offset error, of the electronic device. The process trim is performed while the offset error constituent is being actively removed. In one embodiment, for example, while dynamic element matching control 110 is actively removing the offset error, process trim module 120 performs a gain trim to trim out a temperature dependant gain error from a component or components with which it is coupled in electronic device 140. Such trimming of only the gain error is possible because, at this point, the gain error is measurable as it substantially makes up the remaining amount of the combined gain and offset error that was present in DC initial state output from the electronic device under calibration. Thus, by monitoring the output signal, the gain error is removed by performing a gain trim until the output signal reaches a desired voltage.

Figure 5:
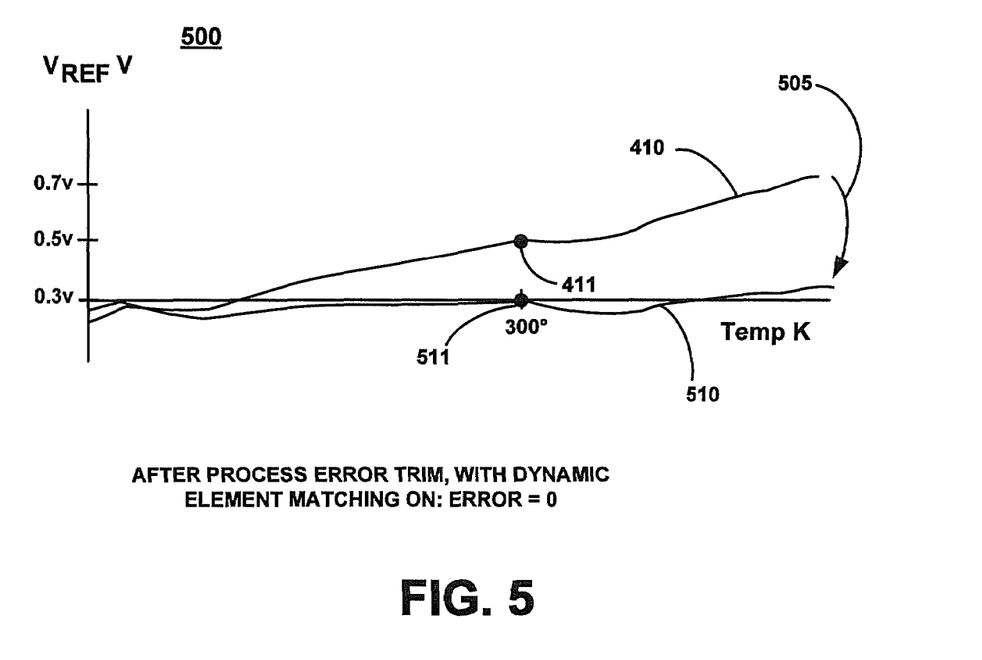
FIG. 5 is a second graph illustrating an exemplary change in the output of an electronic device upon which an embodiment of the present technology is being practiced.

FIG. 5 is a second graph 500 illustrating an exemplary change in the output of an electronic device upon which an embodiment of the present technology is being practiced. FIG. 5 shows the same coordinate axis as graph 400 in FIG. 4. In FIG. 5, signal 410 and the voltage at point 411 represent the same signal and DC voltage as described in graph 400. Arrow 505 shows how gain is removed by trimming. The voltage at point 411 moves from 500 millivolts DC down to, for instance, 300 millivolts DC at the same temperature (300 degrees Kelvin) at point 511. This leaves essentially no error, as point 411 is now at the desired output voltage. Moreover, signal 510 also illustrates that the gain error (which would vary over temperature) will now be removed for all other temperatures as well, not just the single temperature associated with point 511. Thus, while the offset error is actively being reduced, the overall error of the output signal from the circuit under calibration is now essentially zero, and the output signal will be a substantially error free straight line across temperature.

In 325 of flow diagram 300, in one embodiment, the active removal of the offset error constituent is ceased. In one embodiment, this comprises ceasing the active removal of mismatch error from all components of the circuit under test from which it was being actively removed. In another embodiment, this comprises ceasing the active removal of the mismatch error from a selected subset of the components from which the mismatch error was actively being removed, while continuing to actively remove mismatch error for other selected components. Thus, in various embodiments, dynamic element matching control 110 ceases dynamic element matching for some or all components for which dynamic element matching was being performed.

Figure 6:
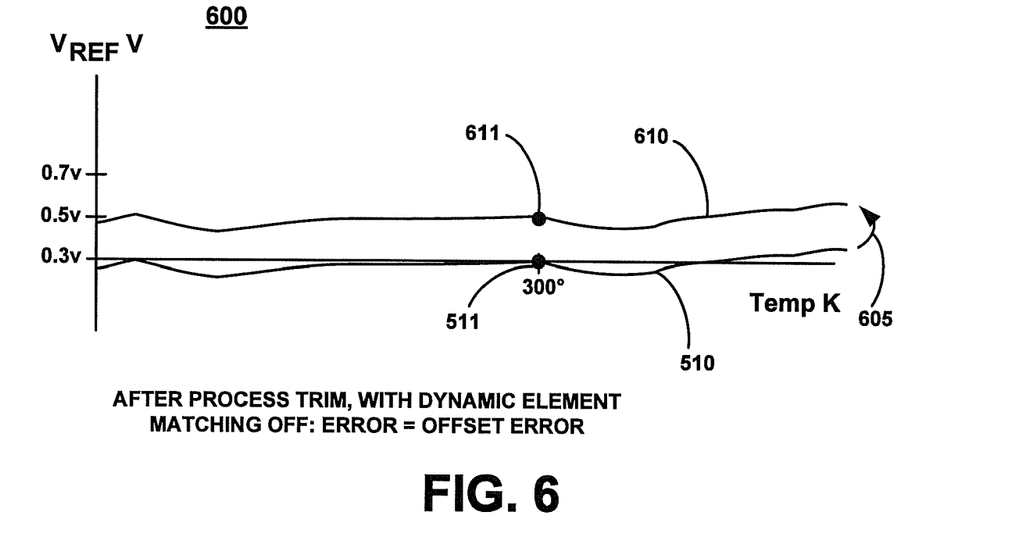
FIG. 6 is a third graph illustrating an exemplary change in the output of an electronic device upon which an embodiment of the present technology is being practiced.

FIG. 6 is a third graph 600 illustrating an exemplary change in the output of an electronic device upon which an embodiment of the present technology is being practiced. FIG. 6 shows the same coordinate axis as graph 500 in FIG. 5. In FIG. 6, signal 510 and the voltage at point 511 represent the same signal and DC voltage as described in graph 500. Arrow 605 shows how the offset error returns when active removal of the mismatch error is ceased. The voltage at point 511 moves from 300 millivolts DC up to, for instance, 500 millivolts DC at the same temperature (300 degrees Kelvin) at point 611. This 200 millivolt increase represents the return of the offset error constituent in the output signal of the electronic device. Moreover, signal 610 also illustrates that the offset error (which would remain constant over temperature) will now exist for all other temperatures as well, not just the single temperature associated with point 611. Thus, when active reduction of offset error is ceased, the overall error of the output signal from the circuit under calibration is substantially attributable to mismatch related offset error alone as process variation related gain error has now been trimmed out with a gain trim.

In 335 of flow diagram 300, in one embodiment, a mismatch trim is performed to trim out the offset error. The mismatch trim is performed while the active removal of a mismatch error constituent is ceased. The mismatch trim is performed while the electronic device remains at substantially an equivalent temperature to a temperature at which the gain trimming was performed to trim out the temperature dependant error. In one such embodiment, mismatch trim module 130 performs this mismatch trim upon components of electronic device 140 while observing the output signal from the electronic device. Since, at this point, offset is the substantial portion of error which keeps the output signal above or below a desired output; mismatched components are simply trimmed until the output signal matches the desired output voltage.

Referring again to 335 of flow diagram 300, in one embodiment where multiple sets of mismatched components will be trimmed, active removal of mismatch is incrementally ceased for the components which are to be trimmed while simultaneously being maintained for other components which are not being trimmed (and have not yet been trimmed). This allows the discernment and trimming out of the individual class of mismatch error (offset of gain) attributable to the components for which the active removal of mismatch error has been ceased. Once this error is discerned, a mismatch trim is performed to reduce the output signal to the desired output. The mismatch trim is performed at substantially the same temperature at which any process trim was performed. This same process is then followed to iteratively and incrementally cease active removal of error from other selected components and then performing a mismatch trim to eliminate the error attributable to those components. Once all active removal of error has ceased and all selected components have been trimmed to eliminate mismatch error, the output signal will be equal to a desired output voltage and will be substantially free of process related gain errors and mismatch related errors.

Figure 7:
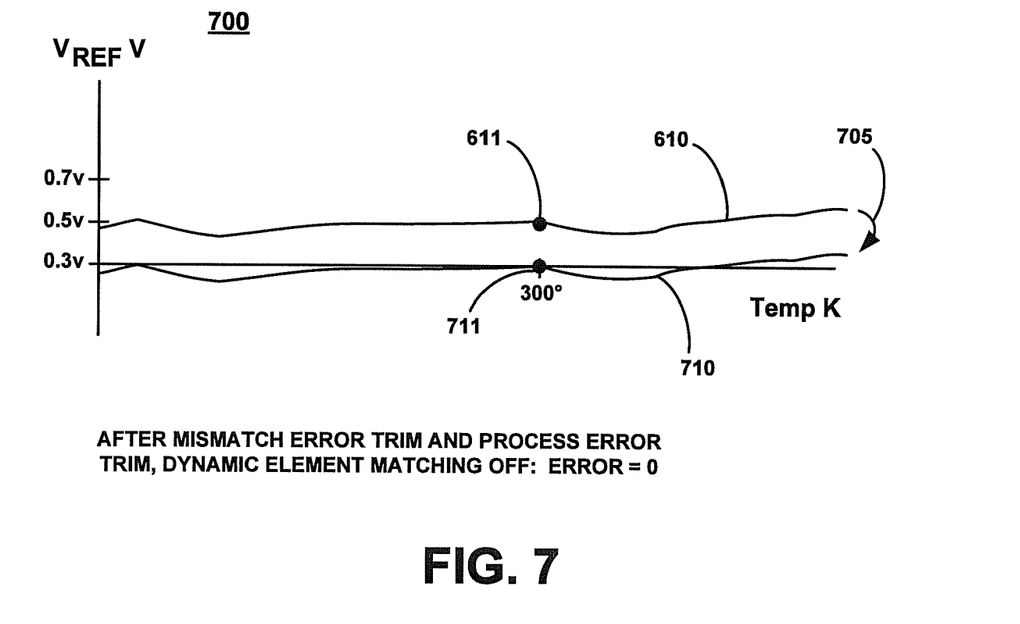
FIG. 7 is a fourth graph illustrating an exemplary change in the output of an electronic device upon which an embodiment of the present technology is being practiced.

FIG. 7 is a fourth graph 700 illustrating an exemplary change in the output of an electronic device upon which an embodiment of the present technology is being practiced. FIG. 7 shows the same coordinate axis as graph 600 in FIG. 6. In FIG. 7, signal 610 and the voltage at point 611 represent the same signal and DC voltage as described in graph 600. Arrow 705 shows how the mismatch related offset error is eliminated via offset trimming. In response to offset trimming, the voltage at point 611, moves from 500 millivolts DC down to the desired output of, for instance, 300 millivolts DC at the same temperature (330 degrees Kelvin) at point 711. This 200 millivolt decrease represents the mismatch related offset error constituent which is trimmed from the output signal of the electronic device. Moreover, signal 710 also illustrates that the output signal will now be substantially a straight line at the desired 300 millivolt output across temperature, not just the single temperature associated with point 711. Thus, the combined mismatch and process variation error has now been removed from the output signal of the device under test by means of the described dual mode single signal data point trimming.

FIG. 8 is a flow diagram 800 of a method for performing a dual mode single temperature trim to remove a combined gain and offset error from a bandgap generator circuit, according to an embodiment of the present technology. In some embodiments, the bandgap generator circuit which method 800 is performed upon is a bandgap generator circuit within a packaged electronic device.

In 810 of flow diagram 800, in one embodiment, dynamic element matching is utilized to remove an offset error constituent of the combined gain and offset error of a bandgap generator circuit. In such an embodiment, the offset error removed is offset error which is due to manufacturing related mismatch. For example dynamic element matching control 110 (FIG. 1) couples to components in various portions of electronic device under test 140 (which is a bandgap generator circuit). Dynamic element matching controller 110 uses dynamic element matching to actively remove mismatch related offset error from components such as metal oxide semiconductors and/or resistors in the portions of electronic device 140 with which it is coupled. Thus, in one such embodiment, the dynamic element matching is used to remove offset error from a CTAT portion of the bandgap generator circuit, such as CTAT generator 143. Likewise, in one embodiment, the dynamic element matching is used to remove offset error from a PTAT portion of the bandgap generator circuit, such as PTAT generator 141. Similarly, in one embodiment, the dynamic element matching is used to remove mismatch error from a buffer portion of the bandgap generation circuit. FIG. 4 (previously described) illustrates an exemplary change in the output signal from a circuit, such as electronic device 140, when dynamic element matching is being performed to eliminate mismatch related offset error from the circuit.

In 820 of flow diagram 800, in one embodiment, a process trim is performed to trim out a temperature dependant error, such as a purely gain or purely offset error, of a bipolar junction transistor used in the bandgap generator circuit. The process trim is performed while the mismatch error constituent (for example, a mismatch related offset error) is being actively removed. In one embodiment, process trim module 120 performs this process trim to eliminate a temperature dependant gain error from a bipolar junction transistor utilized in CTAT generator 143 of electronic device under calibration 140. FIG. 5 (previously described) illustrates an exemplary change in the output signal from a circuit, such electronic device 140, when a process related gain error is trimmed while dynamic element matching is utilized to suppress mismatch related error within the circuit. After the gain error is removed, via the process trim, the remaining error in output signal of the bandgap generator circuit will be an attributable to mismatch error. The amount of mismatch error can now be observed and trimmed out with a second trim mode while the bandgap generator circuit remains at a constant temperature.

In 830 of flow diagram 800, in one embodiment a mismatch trim is performed to trim out the mismatch error constituent. The mismatch trim is performed while the active removal of the offset error constituent is ceased, and while the bandgap generator circuit remains at substantially an equivalent temperature to the temperature at which the process trim was performed to trim out the out a temperature dependant error. In one embodiment, for example, mismatch trim module 130 is coupled with bandgap generator 145 of electronic device 140 and performs this mismatch trim to counter the error associated with MOSFET devices that are used for amplification and/or mirroring. For example, in one embodiment, the mismatch trim removes an offset error associated with these MOSFET devices. Likewise, in one embodiment, mismatch trim module 130 may be coupled to 140 to trim out mismatch related error from other components, such as one or more BJTs and/or resistors. FIG. 7 (previously described) illustrates an exemplary change in the output signal from a circuit, such electronic device 140, when a mismatch related offset error is trimmed after dynamic element matching has been ceased within the circuit. After this second mode of trim at a single temperature, the output signal of the bandgap generator circuit will now be substantially a straight line at the desired output signal level across temperature, not just the single temperature associated with the process and mismatch trimming. Thus, the combined mismatch and process variation error (which in this example was a combined gain and offset error) has now been removed from the output signal of bandgap generator circuit by means of the described dual mode single temperature trimming.

Embodiments of the present technology for dual mode single temperature trimming are thus described. While the present technology has been described in particular embodiments, it should be appreciated that the present technology should not be construed as limited by such embodiments, but rather construed according to the below claims.

What is claimed is:

1. A system for performing a dual mode single temperature trim upon an electronic device to remove combined mismatch and process variation errors, said system comprising:
   a dynamic element matching control, said dynamic element matching control configured for enabling dynamic element matching of components of said electronic device;
   a process trim module, said process trim module configured for performing a process trim to remove a temperature dependant error from said electronic device while said dynamic element matching is enabled within said electronic device; and
   a mismatch trim module, said mismatch trim module configured for performing a mismatch trim to remove a mismatch error from said electronic device after said process trim has been performed, wherein said mismatch trim is performed on a portion of said electronic device while said dynamic element matching has been disabled, and wherein said mismatch trim is performed at substantially an equivalent temperature to a temperature at which said process trim was performed.

2. The system of claim 1, wherein said dynamic element matching module is further configured to receive external control signals, and in response to said external control signals to selectively enable and disable dynamic element matching in a plurality of portions of said electronic device.

3. The system of claim 1, wherein said electronic device comprises a packaged electronic device.

4. The system of claim 1, wherein said electronic device is a bandgap voltage generator.

5. The system of claim 1, wherein said process trim module is configured to perform said process trim to remove a bipolar junction transistor process variation gain error from said electronic device.

6. The system of claim 1, wherein said mismatch trim module is configured to perform said mismatch trim to remove a metal oxide semiconductor field effect transistor mismatch error from said electronic device.

7. The system of claim 1, wherein said mismatch trim module is configured to perform said mismatch trim to remove a resistor mismatch error from said electronic device.

8. A method for performing a dual mode single temperature trim upon an electronic device to remove combined mismatch and process variation errors, said method comprising:
   utilizing a calibration technique to actively remove a mismatch error constituent of said combined mismatch and process variation errors of said electronic device;
   performing a process trim to trim out a temperature dependant error of said electronic device, wherein said process trim is performed while said mismatch error constituent is being actively removed;
   ceasing said active removal of said mismatch error constituent; and
   performing a mismatch trim to trim out said mismatch error constituent, wherein said mismatch trim is performed while said active removal of said mismatch error constituent is ceased, and wherein said electronic device remains at substantially an equivalent temperature to a temperature at which said process trim was performed.

9. The method as recited in claim 8, wherein said utilizing a calibration technique to actively remove a mismatch error constituent of said combined mismatch and process variation errors of said electronic device comprises:
   utilizing dynamic element matching to remove said mismatch error constituent of said combined mismatch and process variation errors of said electronic device.

10. The method as recited in claim 8, wherein said ceasing said active removal of said mismatch error constituent comprises:
   ceasing active removal of a portion of said mismatch error constituent attributed to selected components in a portion of said electronic device, while continuing to actively trim any remainder of said mismatch error constituent from said electronic device.

11. The method as recited in claim 10, wherein said performing a mismatch trim to trim out said mismatch error constituent, wherein said mismatch trim is performed while said active removal of said mismatch error constituent is ceased, and wherein said electronic device remains at substantially an equivalent temperature to a temperature at which said process trim was performed comprises:
   performing a mismatch trim to trim out a mismatch error constituent from said selected components, wherein said mismatch trim is performed while said active removal of said mismatch error is ceased for said selected components, and wherein said electronic device remains at substantially an equivalent temperature to a temperature at which said process trim was performed.

12. The method as recited in claim 8, wherein said electronic device comprises a packaged electronic device.

13. The method as recited in claim 8, wherein said temperature dependant error comprises a temperature dependent gain error.

14. The method as recited in claim 8, wherein said temperature dependant error comprises a temperature dependent offset error.

15. A method for performing a dual mode single temperature trim to remove combined mismatch and process variation errors from a bandgap generator circuit, said method comprising:
   utilizing dynamic element matching to actively remove a mismatch error constituent of said combined mismatch and process variation errors;
   performing a process trim to trim out a temperature dependant error of a bipolar junction transistor used in said bandgap generator circuit, wherein said process trim is performed while said mismatch error constituent is being actively removed; and
   performing a mismatch trim to trim out said mismatch error constituent, wherein said mismatch trim is performed while said active removal of said mismatch error constituent is ceased, and wherein said bandgap generator circuit remains at substantially an equivalent temperature to a temperature at which said process trim was performed.

16. The method as recited in claim 15, wherein said utilizing dynamic element matching to remove a mismatch error constituent of said combined mismatch and process variation errors comprises:
   utilizing said dynamic element matching to remove a mismatch error that is attributed to a metal oxide semiconductor field effect transistor mismatch error in said bandgap generator circuit.

17. The method as recited in claim 15, wherein said utilizing dynamic element matching to remove a mismatch error constituent of said combined mismatch and process variation errors comprises:
   utilizing said dynamic element matching to remove a mismatch error that is attributed to a resistor in said bandgap generator circuit.

18. The method as recited in claim 15, wherein said performing a mismatch trim to trim out said mismatch error constituent comprises:
   performing a mismatch trim on a metal oxide semiconductor field effect transistor of said bandgap generator circuit.

19. The method as recited in claim 15, wherein said performing a mismatch trim to trim out said mismatch error constituent comprises:
   performing a mismatch trim on a resistor of said bandgap generator circuit.

20. The method as recited in claim 15, wherein said bandgap generator circuit comprises a bandgap generator circuit of a packaged electronic device.

21. The method as recited in claim 15, wherein said temperature dependant error comprises a temperature dependent gain error.

22. The method as recited in claim 15, wherein said temperature dependant error comprises a temperature dependent offset error.

* * * * *